US011959680B2

(12) United States Patent
Van De Oudeweetering

(10) Patent No.: US 11,959,680 B2
(45) Date of Patent: Apr. 16, 2024

(54) CLIMATE CONTROL UNIT FOR CONTROLLING AIR TEMPERATURE AND HUMIDITY AND SYSTEM COMPRISING THE SAME

(71) Applicant: Air Supplies Holland B.V., Amsterdam (NL)

(72) Inventor: Ronald Van De Oudeweetering, Amsterdam (NL)

(73) Assignee: Air Supplies Holland B.V., Amsterdam (NL)

( * ) Notice: Subject to any disclaimer, the term of this patent is extended or adjusted under 35 U.S.C. 154(b) by 371 days.

(21) Appl. No.: 17/195,170

(22) Filed: Mar. 8, 2021

(65) Prior Publication Data

US 2021/0285708 A1  Sep. 16, 2021

(30) Foreign Application Priority Data

Mar. 13, 2020  (NL) ...................................... 2025130

(51) Int. Cl.
*F25B 41/42* (2021.01)
*F24F 3/153* (2006.01)
(Continued)

(52) U.S. Cl.
CPC ............ *F25B 49/022* (2013.01); *F24F 3/153* (2013.01); *F25B 39/00* (2013.01); *F25B 41/20* (2021.01); *F25B 41/34* (2021.01); *F25B 41/385* (2021.01); *F25B 41/42* (2021.01); *F25B 2600/024* (2013.01); *F25B 2600/2513* (2013.01); *F25B 2700/02* (2013.01); *F25B 2700/197* (2013.01); *F25B 2700/21173* (2013.01); *F25B 2700/21175* (2013.01)

(58) Field of Classification Search
CPC ............... F24F 3/153; F25B 2600/021; F25B 2600/025; F25B 2700/02; F25B 2700/21172; F25B 2700/21173; F25B 2700/21175; F25B 6/02; F25B 41/30; F25B 41/385; F25B 41/42; F25B 2600/02; F25B 2600/024; F25B 2600/2513
See application file for complete search history.

(56) References Cited

U.S. PATENT DOCUMENTS 3,264,840 A      8/1966   Harnish
4,813,474 A  *   3/1989   Umezu .................... F24F 11/32
                                                         62/176.5

(Continued)

FOREIGN PATENT DOCUMENTS

DE   102011120176 A1 *  6/2013  ................ F25B 1/10
EP        1801520         6/2007
WO       2008016348       12/2017

*Primary Examiner* — Jerry-Daryl Fletcher
*Assistant Examiner* — Daniel C Comings
(74) *Attorney, Agent, or Firm* — Marcus C. Dawes

(57) ABSTRACT

The present application concerns a climate control unit for controlling air temperature and/or humidity. Moreover, the present application concerns a system comprising such a climate control unit. The climate control unit according to the invention makes use of two refrigerant paths that share a common part in which a compressor and evaporator are arranged, and that each have a non-shared part. A reheat coil is provided in one of the non-shared parts. According to the invention, a respective expansion device is provided in both non-shared parts.

22 Claims, 2 Drawing Sheets

Figure 1:
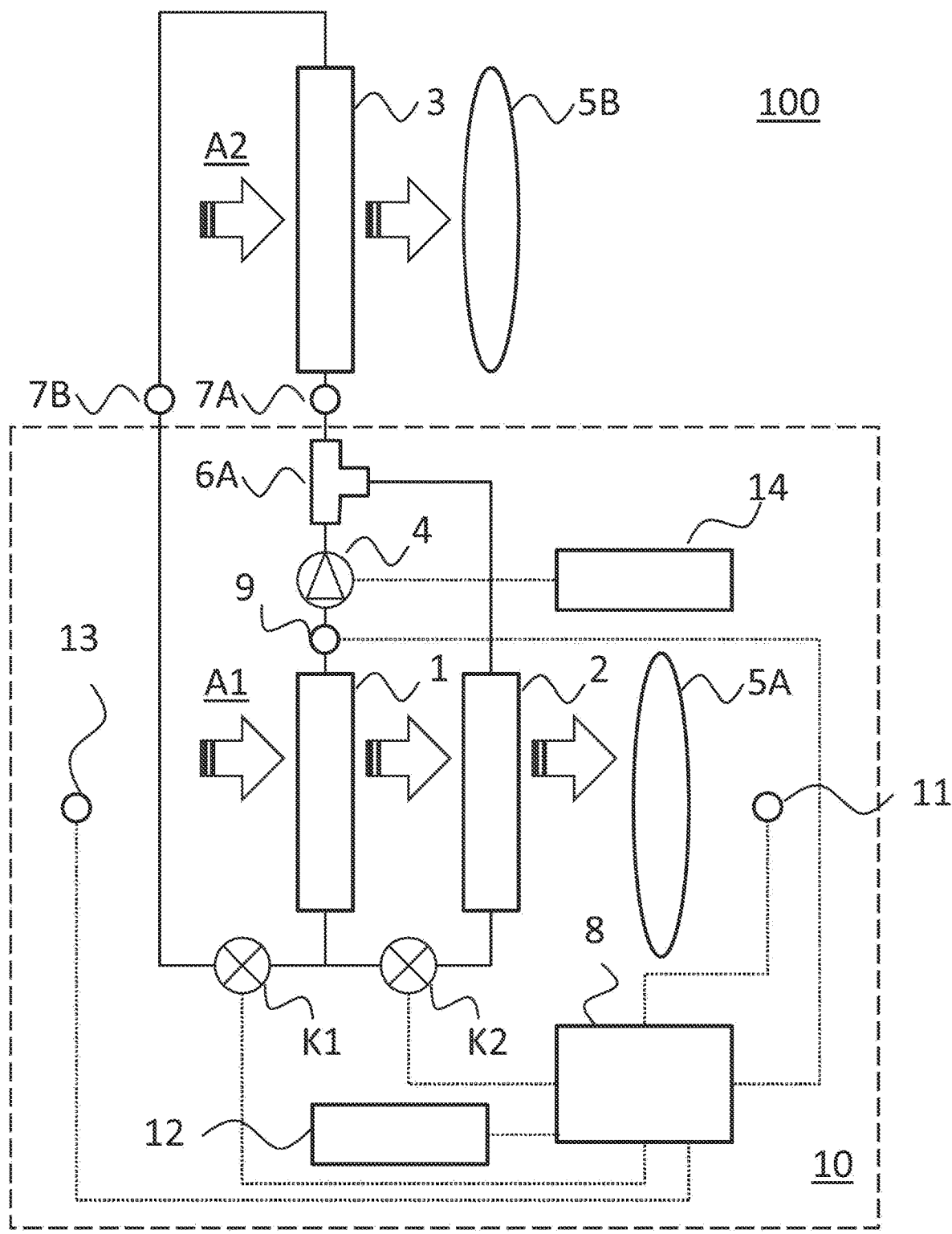

(51) Int. Cl.
*F25B 39/00* (2006.01)
*F25B 41/20* (2021.01)
*F25B 41/34* (2021.01)
*F25B 41/385* (2021.01)
*F25B 49/02* (2006.01)

(56) References Cited

U.S. PATENT DOCUMENTS

| | | | | |
|---|---|---|---|---|
| 5,277,034 | A * | 1/1994 | Hojo | F25B 13/00 |
| | | | | 62/223 |
| 6,164,081 | A * | 12/2000 | Jensen | F25B 41/335 |
| | | | | 62/224 |
| 2006/0225444 | A1 * | 10/2006 | Taras | F24F 3/153 |
| | | | | 62/196.4 |
| 2009/0277193 | A1 * | 11/2009 | Springer | F24F 11/77 |
| | | | | 62/93 |
| 2010/0107668 | A1 | 5/2010 | Voorhis | |
| 2015/0159920 | A1 | 6/2015 | Ha | |
| 2016/0273815 | A1 * | 9/2016 | Downie | F25B 49/02 |
| 2018/0031253 | A1 * | 2/2018 | McCune | F25B 5/04 |

* cited by examiner

CLIMATE CONTROL UNIT FOR CONTROLLING AIR TEMPERATURE AND HUMIDITY AND SYSTEM COMPRISING THE SAME

The present application concerns a climate control unit for controlling air temperature and/or humidity. Moreover, the present application concerns a system comprising such a climate control unit.

Climate control units and systems comprising such units are known from the prior art, for example from Taras, M. (2008). "Comparison of reheat strategies for constant volume rooftop units", white paper published by Carrier corporation.

Known climate control units comprise, for example, a reheat coil, a compressor, and an evaporator of which the output is connected to the compressor. These climate control units comprise internal condensers, or are at least configured to be coupled to an external condenser, for outputting thermal energy. When coupled together, these elements form a refrigerant circuit. Such a refrigerant circuit comprises a first refrigerant path extending between an output of the compressor and an input of the evaporator through the condenser, and a second refrigerant path extending between the output of the compressor and the input of the evaporator through the reheat coil. The first and second refrigerant paths share a common part and each have their respective individual parts, wherein the reheat coil is arranged inside the individual part of the second refrigerant path. Furthermore, some climate control units comprise an expansion device, such as a thermal expansion device (TXV) or an electronic expansion valve (EEV), arranged in the first refrigerant path, which is configured to control a flow of the refrigerant in that path.

Such climate control units use a three-way junction, for example a mechanical three-way valve or two one way valves, to control the incoming stream of the refrigerant and divide it into two streams, directly after the refrigerant leaves the compressor. However, said valves are vulnerable to mechanical defects and leaking.

A refrigerant path can be completely blocked off by either arrangement of a three-way valve or two one-way valves. Known climate control units comprise check valves at the far end of blocked-off paths which prohibit refrigerant from flowing back into this path through other directions. This should ensure that an unused refrigerant path remains at a low pressure, or at least at a pressure lower than a used refrigerant path. However, if leakage occurs in the three-way valve, either of the two one-way valves or the check valve, the unused refrigerant path eventually fills up, causing loss of refrigerant and therefore pressure in the active part of the refrigerant circuit.

The present application at least partially solves the above-mentioned shortcomings by providing a climate control unit which, instead of using a three-way valve and an additional check valve, is characterized in that the climate control unit further comprises a second expansion device configured to control a flow of the refrigerant in the second refrigerant path and in that the first and second expansion devices are arranged in the individual parts of the first and second refrigerant paths, respectively.

According to the present invention, the flow of refrigerant through the reheat coil and the flow of refrigerant directly entering the evaporator can be controlled individually.

As neither a three-way valve nor any check valve is required, the climate control unit does not suffer from the drawbacks known to occur with said elements. Additionally, no part of the refrigerant circuit is expected to be empty or at low pressure and, therefore, there is less risk of 'losing' refrigerant and therefore pressure.

Moreover, making use of two expansion devices, more in particular two electronic expansion valves, in the individual parts of the refrigerant paths allows for a climate control unit which can control the flow of refrigerant passing through the first or second refrigerant path independently, and more in particular, allows for the climate control unit to control the ratio of the refrigerant flowing through each individual part.

Each of the mentioned first and/or second expansion devices may be implemented by an electronic expansion valve (EEV) or a thermostatic expansion valve (TXV).

While it is common in the art to cool the condenser of the climate control system by enabling an airflow through it, the skilled person will understand that the condenser can also be water-cooled by running water through a plate-type heat exchanger or a 'coil-in-tube' heat exchanger. Such water-cooled condensers do not rely on outdoor circumstances, which may be volatile.

The first expansion device can be arranged in between the condenser and the input of the evaporator. This allows the first electronic expansion valve to control the flow rate of the refrigerant going from the condenser into the evaporator independent from the flow of refrigerant through the reheat coil. Additionally or alternatively, the second expansion device can be arranged in between the reheat coil and the input of the evaporator. This allows the second electronic expansion valve to control the flow rate of the refrigerant going from the reheat coil into the evaporator. It should be noted that the refrigerant passing through the second expansion device can be colder than the refrigerant passing through the first expansion device as the former refrigerant can be cooled in the reheat coil, by the air that had initially been cooled by the evaporator.

The second refrigerant path may extend between the output of the compressor and the input of the evaporator through the condenser and through the reheat coil in that order. This allows refrigerant to flow into the reheat coil in a mostly liquid state. This configuration is therefore referred to as liquid reheat. In such case, the climate control unit may further comprise an outlet connected to the output of the compressor and connectable to an inlet of the condenser, and an inlet connectable to an outlet of the condenser, and connected, via a T-junction, to an input of the reheat coil and to an input of the first electronic expansion valve.

Alternatively, the condenser can be arranged in the individual part of the first refrigerant path. In this configuration, the refrigerant which passes through the reheat coil comes directly from the compressor and is still mostly in a gaseous state. This configuration is therefore referred to as gas-reheat.

To connect the climate control unit with a condenser to achieve the earlier mentioned liquid reheat configuration, the climate control unit may further comprise an outlet connectable to an inlet of the condenser, wherein an output of the compressor is connected, via a T-junction, to the outlet and to an input of the reheat coil, and an inlet connected to the first electronic expansion valve and connectable to an outlet of condenser.

The climate control unit may further comprise a controller for controlling the compressor and the first and second expansion devices. In particular, the climate control unit may comprise an inverter for supplying power to the compressor and wherein controlling the compressor comprises controlling the amount of power supplied by the inverter to the compressor. Moreover, the climate control unit may comprise a first sensing unit for sensing a temperature and pressure of the refrigerant between the output of the evaporator and the input of the compressor, wherein the controller may be configured to control the first and second expansion devices in dependence of the refrigerant pressure and/or temperature. The first temperature and first pressure sensors may preferably be arranged at the output of the evaporator. This information allows the controller to calculate the superheat of the system and control the first and/or second expansion devices to ensure that a minimal superheat is maintained. This allows the climate control unit to avoid the situation that refrigerant in a liquid state is fed to the compressor as feeding liquids may damage the compressor. The super heat of a system is calculated by subtracting a boiling point of the refrigerant from the sensed temperature of the refrigerant. To determine the boiling point, the controller of the climate control unit may have access to a look-up table, also called a refrigerant chart, and determine the boiling point by looking up said boiling point corresponding to the sensed pressure.

The climate control unit may further comprise a user input module in which a user can select a desired air temperature and/or air humidity. The climate control unit may also comprise a ventilator which can be activated by the controller, and which, when activated, causes a first airflow which passes through the evaporator and the reheat coil, in that order.

A second sensing unit may be used for sensing a temperature and/or humidity of the air in the first airflow upstream of the evaporator. Additionally or alternatively, a third sensing unit may be used for sensing a temperature and/or humidity of the air in the first airflow downstream of the evaporator preferably downstream of the reheat coil.

The controller can be configured to, at least during operation, operate the climate control unit in a cooling mode. In this mode, the controller controls the power supplied to the compressor to control the cooling power of the climate control unit in dependence of the desired temperature and the temperature of the air as sensed by the second and/or third sensing unit. When passing through the evaporator, air will decrease in both temperature and humidity. As the goal is to cool, the controller ensures a closed state of the second expansion device. There will be no refrigerant flowing through the reheat coil and therefore no thermal energy is provided back to the airflow.

The controller then controls the first expansion valve to ensure that the superheat remains positive. Said mode can operate regardless of the resulting dehumidification. As noted before, to prevent damage to the compressor, it is important to ensure that no liquid will be fed to the compressor. This can be ensured by preventing that the refrigerant cools down to a temperature below the boiling point of the refrigerant at the relevant pressure. In most cases, superheated gas is fed to the compressor. The temperature of this gas is above the boiling point of the gas. Increasing the superheat will reduce the likelihood of the compressor from getting damaged but will at the same time reduce the efficiency of the climate control unit. For that reason, the controller will generally be configured to keep the superheat in a given range, e.g. 5 degrees Celsius, above the boiling point.

In particular, the controller can be configured to operate the climate control unit in the cooling mode if the temperature of the air is above the desired temperature and if the humidity of the air is at or below the desired humidity regardless of the resulting dehumidification.

To determine this, the temperature of the air upstream of the evaporator could be considered as representing for instance the temperature of the air in a room to be cooled by the climate control unit.

In another example of the cooling mode, the controller will not use the temperature of the air upstream of the evaporator, but the temperature of the air downstream of the evaporator. In this scenario, the controller will compare the temperature of the air that is fed to the room to be controlled to the desired temperature set by the user. By comparing the temperature of the air to the desired temperature, it can be determined if the compressor needs to be controlled to increase the cooling power of the climate control system to bring down the temperature of the air after having been cooled by the evaporator.

Such a controller may also be configured to operate the climate control unit in a dehumidifying mode. In this mode the controller controls the power supplied to the compressor to control the dehumidification power of the climate control unit in dependence of the desired humidity and the humidity of the air as sensed by the second and/or third sensing unit. When passing through the evaporator, air will decrease in both temperature and humidity, however as the goal is only to dehumidify, the controller ensures a closed state of the first expansion device. All refrigerant will flow through the reheat coil and therefore, as much thermal energy as possible is provided back to the airflow. The controller then controls the second expansion device (K2) to ensure that the superheat remains positive.

In particular, the controller is configured to operate the climate control unit in the dehumidification mode if the temperature of the air is at or below the desired temperature and if the humidity of the air is above the desired humidity.

Either of these controllers may also be configured to operate the climate control unit in a hybrid mode. In this mode, the controller controls the power supplied to the compressor to control the dehumidification power of the climate control unit in dependence of the desired humidity and the humidity of the air as sensed by the second and/or third sensing unit and controls the ratio of refrigerant flowing through the first and second expansion device to keep the cooling power constant.

In particular, the controller is configured to switch from the cooling mode to the hybrid mode if the temperature of the air has decreased, during the cooling mode, to a value within a predefined range of the desired temperature and if the sensed humidity of the air sensed by the second and/or third sensing unit is above the desired humidity and/or if a desired humidity has not been inputted.

The present invention equally relates to a system comprising a climate control unit as described above and a condenser having an inlet and an outlet connected to the outlet and the inlet of the climate control unit, respectively. Such condenser is configured to transport away heat from the area or room of which the climate needs to be controlled. For example, the condenser can be mounted outside.

Figure 2:
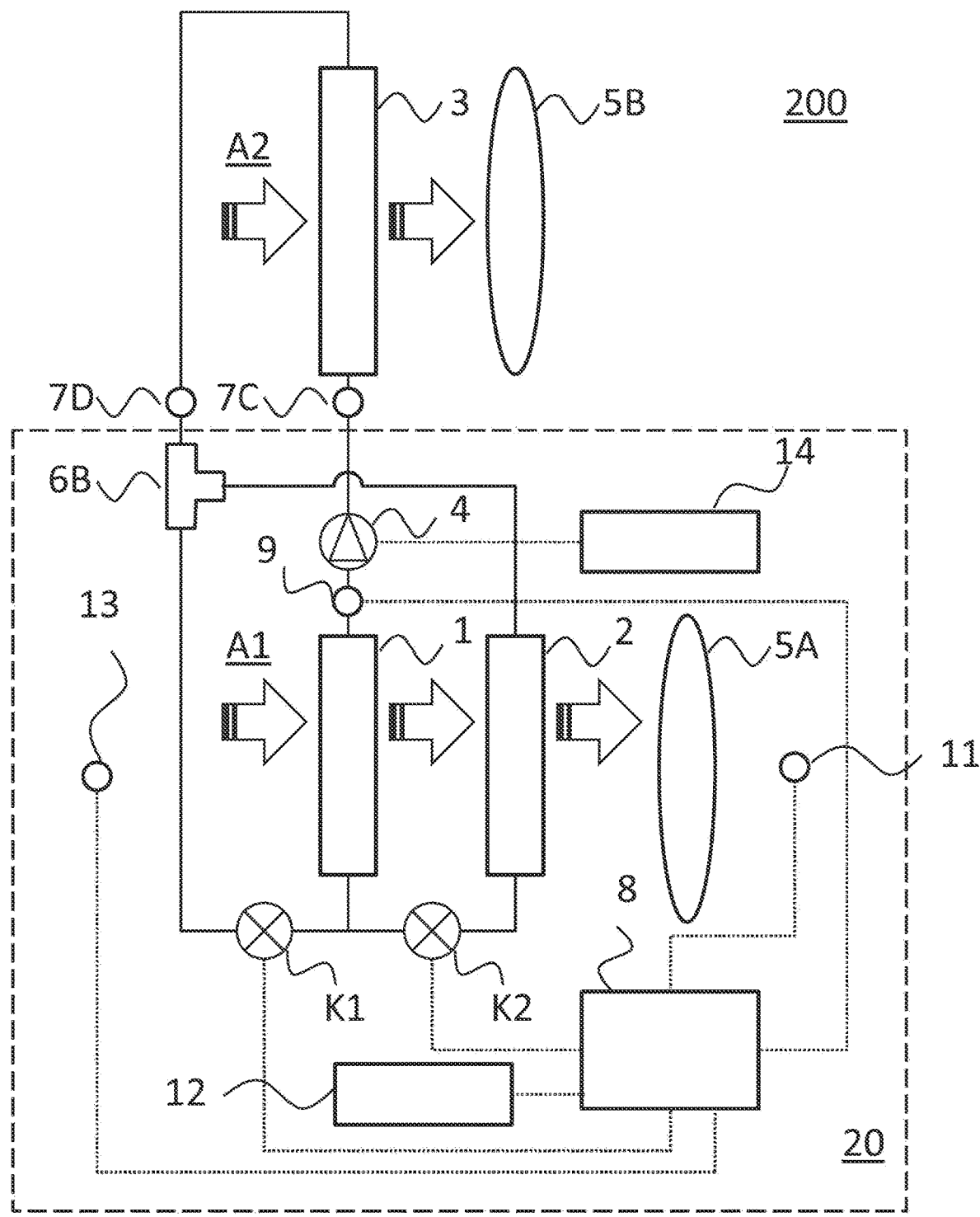

Further advantages, features and details of possible embodiments of the climate control unit will be elucidated on the basis of the following description of the accompanying figures, wherein:

FIG. 1 shows a schematic representation of a climate control system comprising a possible embodiment of a climate control unit according the present invention in which a gas reheat configuration is used; and FIG. 2 shows a schematic representation of a climate control system comprising a further possible embodiment of a climate control unit according the present invention in which a liquid reheat configuration is used.

The system of FIG. 1 is a possible embodiment of a climate control system 100 according to the present application, in which a climate control unit 10 is arranged to function as a gas-reheat system. System 100 comprises a climate control unit 10 that is typically arranged in an enclosed space to be cooled, e.g. a room, and a condenser 3 that is typically arranged outside of the enclosed space or is embodied as a water-cooled condenser.

In the refrigerant circuit of system 100, two refrigerant paths can be identified. In the first path, starting from evaporator 1, the refrigerant passes through a compressor 4, through condenser 3, and through a first electronic expansion valve K1 before returning to evaporator 1.

In this first path, the refrigerant leaving evaporator 1 should be completely gaseous to avoid damaging compressor 4. It should therefore be ensured that the temperature of the refrigerant is at or above the boiling point of the refrigerant. To measure this temperature, climate control unit 10 is provided with a first sensing unit 9 between evaporator 1 and compressor 4. The amount that the measured temperature is above the boiling point of the refrigerant is called the superheat. It is preferred that this superheat is kept as low as possible to optimize the efficiency of system 100.

Compressor 4 compresses the low-pressure, relatively cold gaseous refrigerant into a high-pressure, hotter gaseous refrigerant. In condenser 3, this high-pressure, hot gaseous refrigerant is cooled because thermal energy is outputted by condenser 3 to the outside, e.g. outside air. More in particular, the gaseous refrigerant condenses into a high-pressure, warm liquid refrigerant. In electronic expansion valve K1, the high-pressure, warm liquid refrigerant is expanded and a low-pressure, colder mixture of liquid/gas refrigerant is provided to evaporator 1.

In evaporator 1, the low-pressure, colder refrigerant absorbs thermal energy from the air that passes by evaporator 1 causing the refrigerant to evaporate. Therefore, evaporator 1 will output a low-pressure, cold gaseous refrigerant after which the abovementioned cycle may continue.

In the second path, starting from evaporator 1, the refrigerant passes through compressor 4, through a reheat coil 2, and through a second electronic expansion valve K2 before returning to evaporator 1. In the second refrigerant path, the mixture that is cooled by evaporator 1 is reheated by the relatively hot refrigerant that passes through reheat coil 2. In this manner, moisture can be extracted from the ambient air, by means of condensation on evaporator 1, while at the same time preventing excessive cooling of the air.

The second refrigerant path shares a part with the first refrigerant path, namely the part of the refrigerant circuit comprising evaporator 1 and compressor 4. The parts of the refrigerant circuit that are not shared by the first and second paths are indicated as the first and second individual parts, respectively. The shared part of the first and second paths is connected to a T-junction 6A that is arranged directly after compressor 4. This T-junction splits the incoming refrigerant flow from compressor 4 into the first and second individual parts and directs refrigerant to both the input of condenser 3 and the input of reheat coil 2. The respective individual parts are joined later at the input of evaporator 1.

In reheat coil 2, the high-pressure, hot gaseous refrigerant coming from compressor 4 is cooled due to the cold air coming from evaporator 1. In electronic expansion valve K2, the high-pressure, cold mixture of liquid/gas refrigerant is expanded and a low-pressure, colder liquid refrigerant is outputted. Similar to expansion device K1, expansion device K2 may output a mixture of refrigerant in the gaseous and liquid states.

In the system shown in FIG. 1, condenser 3 is connected to climate control unit 10. More in particular, an inlet for condenser 3 is connected to an outlet 7A of climate control unit 10 and an outlet of condenser 3 is connected to an inlet 7B of climate control unit 10. Outlet 7A is connected to one of the outputs of T-junction 6A and inlet 7B is connected to electronic expansion valve K1.

Furthermore, climate control unit 10 comprises a ventilator or fan 5A arranged in such a manner that, when activated, ventilator 5A causes a first airflow A1 in which air is moved through evaporator 1 and through reheat coil 2. It should be noted that evaporator 1 and reheat coil 2 can both be embodied substantially identical, e.g. as a coil unit through which air may pass. As mentioned earlier, in evaporator 1, thermal energy is absorbed by the refrigerant from the air. Moreover, as mentioned earlier, in reheat coil 2, heat is transferred from the refrigerant to the air passing through reheat coil 2. The air that has passed through reheat coil 2 is supplied to the surrounding environment. To measure the temperature and/or humidity of the outgoing air, a sensing unit 11 is installed in airflow path A1 downstream of evaporator 1 and reheat coil 2. Similarly, to measure the temperature and/or humidity of the incoming air, which is representative for the temperature in the enclosed space to be cooled, a sensing unit is 13 is installed in airflow path A1 downstream of evaporator 1 and reheat coil 2.

Furthermore, condenser 3 may comprise a second ventilator or fan 5B arranged in such a manner that, when activated, ventilator 5B causes a second airflow A2 in which air is moved through condenser 3. This will increase the capacity with which condenser 3 is able to exchange heat with its surroundings, typically outside of the enclosed space to be cooled.

Climate control unit 10 comprises a controller 8 for controlling the active elements, i.e. ventilator 5A and first and second electronic expansion valves K1, K2. If controller 8 is connected to condenser 3, it may also control ventilator 5B. Furthermore, a user input unit 12 may be provided by which a user may input a desired temperature and/or humidity.

The system of FIG. 2 is another possible embodiment of a climate control system 200 according to the present application, in which a climate control unit 20 is arranged to function as a liquid-reheat system. System 200 comprises a climate control unit 20 that is typically arranged in an enclosed space to be cooled, e.g. a room, and a condenser 3 that is typically arranged outside of the enclosed space.

In the refrigerant circuit of system 200, again two refrigerant paths can be identified. The first path through the refrigerant circuit is similar to the first path in FIG. 1.

The second path, however, is different in this embodiment. Starting from evaporator 1, the refrigerant passes through compressor 4, through condenser 3, through reheat coil 2, and through electronic expansion valve K2 before returning to evaporator 1.

The part of the second refrigerant path that is shared with the first refrigerant path now comprises evaporator 1, compressor 4 and condenser 3. Again, the parts of the refrigerant circuit that are not shared by the first and second paths are defined as the first and second individual parts, respectively. A T-junction 6B is connected directly after condenser 3 and directs an incoming refrigerant stream to both electronic expansion valve K1 and the input of reheat coil 2. The respective individual parts are joined later at the input of evaporator 1.

Condenser 3 is connected to climate control unit 20. More in particular, an inlet for condenser 3 is connected to an outlet 7C of climate control unit 20 and an outlet of condenser 3 is connected to an inlet 7D of climate control unit 20. Outlet 7C is connected to the output compressor 4 and inlet 7D is connected to the input of T-junction 6B.

The other components of system 200 are identical to those of system 100 and a further explanation is therefore considered redundant.

If condenser 3 is a water-cooled model, condenser 3 is not necessarily arranged outside of the enclosed space to be cooled. Instead, a cold water supply is provided to the water-cooled condenser. In this embodiment, one or more water flow valves may be provided to enable a flow of water and hereby provide a similar functionality as ventilator 5B in the abovementioned embodiments. Moreover, the climate control unit may be manufactured with said condenser included the climate control unit itself. The refrigerant paths as defined before are maintained. However, such an embodiment does not necessarily require the inlet/outlet structure. Such water-cooled models do not rely on outdoor circumstances, which is advantageous, since if a temperature outside of the space to be heated the becomes too cold, then the pressure within condenser 3 may decrease, which will cause too much refrigerant to migrate to condenser 3 when K1 is fully closed.

Next, an operation cycle will be described in which a user has inputted a desired temperature of 20 degrees and a desired humidity of 40% for a room that has an initial temperature of 25 degrees and a humidity of 70%. This operational cycle will be described referring to the gas-reheat configuration shown in FIG. 1. It should be noted that the values provided next only serve to illustrate the working principles of the invention and should not be construed as limiting the invention to these values only.

First, controller 8 will operate climate control unit 10 in a mode referred to as cooling mode. In this mode, controller 8 will control the cooling power of the climate control unit based on the desired temperature and at least one of a temperature measured by sensing unit 11 and a temperature measured by sensing unit 13. Furthermore, controller 8 will close expansion valve K2 and control expansion valve K1 to maintain a minimal super heat. More in particular, controller 8 can control an inverter 14 which provides power to compressor 4.

In this example, the refrigerant to be used is R410A, which has a boiling point of 11 degrees Celsius at a pressure of 10 bar.

Initially, compressor 4 will output the refrigerant with a pressure of 26 bar and a temperature of 66 degrees Celsius. This refrigerant will enter condenser 3, which will cool down the gaseous refrigerant to a liquid refrigerant at a pressure of 25.7 bar and a temperature of 33 degrees Celsius.

The liquid refrigerant will enter expansion valve K1, where it will be expanded into a gas/liquid mixture having a pressure of 8 bar and a temperature of 5 degrees Celsius. Inside evaporator 1, the refrigerant will be heated by airflow A1 which initially is at 25 degrees Celsius. For example, the refrigerant will evaporate inside evaporator 1 into a gaseous state at a pressure of 8 bar and a temperature of 8 degrees Celsius. This gaseous refrigerant will be outputted to compressor 4.

At the output of evaporator 1, the pressure of the refrigerant is 8 bar. The boiling point of the refrigerant at this pressure equals 8 degrees Celsius. The temperature sensed by sensing unit 9 is 13 degrees Celsius. Consequently, the refrigerant is superheated by 5 degrees Celsius, thereby preventing liquid refrigerant from entering and damaging compressor 4.

The air outputted by climate control unit 10 has been cooled down to 13 degrees Celsius. Accordingly, the room will gradually cool down. This will result in a decreasing temperature difference between the air in air flow A1 and the refrigerant in evaporator 1. Less heat will therefore be absorbed by the refrigerant in evaporator 1 resulting in a decrease in the amount of superheat.

Once the desired temperature has been reached, controller 8 may operate climate control unit 10 in a dehumidifying mode. To make this determination, the desired room temperature may be checked against the temperature of the incoming air flow as measured by sensing unit 13. However, additionally or alternatively, the temperature of the outgoing air flow as measured by sensing unit 1 can be used.

In this mode, the room temperature should be kept substantially constant while decreasing the air humidity. Here it is noted that, during the cooling mode, the humidity has already been reduced from approximately 70 percent to 55 percent, which is still higher than the desired humidity of 40 percent.

In this mode, a comparison can be made between the temperature of the outgoing air flow as measured by sensing unit 11 and the desired temperature. If this difference is too large, i.e. the temperature of the outgoing air flow is less than the desired temperature minus a given offset, it may be decided by controller 8 that expansion valve K1 should be closed. In such case, all of the refrigerant used in evaporator 1, has also been used by reheat coil 2 for heating up the outgoing air. In this manner, the temperature of the outgoing air can be brought back to within a predefined range of the desired temperature.

For example, the temperature of the air that has passed through evaporator 1 may be 18 degrees Celsius, whereas the outgoing air may have a temperature of 28 degrees Celsius. Moreover, the pressure and temperature of the liquid refrigerant inside condenser 2 and evaporator 1 may be 42 degrees at 26 bar and 7 degrees at 9 bar, respectively.

If the temperature is within the predefined range, controller 8 may control both expansion valves K1 and K2. Increasing the orifice of expansion device K1 while decreasing the orifice of K2 ensures that less refrigerant flows through the reheat coil.

Controller 8 will control expansion valves K1 and K2 such that the desired temperature and humidity is reached while at the same time ensuring that the superheat is maintained within acceptable limits. In this respect, the total flow of refrigerant through expansion devices K1 and K2 is also important. For example, if too much liquid refrigerant is provided to evaporator 1, regardless whether it comes from K1 or K2, the amount of superheat may decrease. To make sure that there is always a positive superheat, one of the expansion devices K1 or K2 is closed before the other is opened.

In addition, ventilator or fan 5A may be controlled by controller 8 to regulate the heat exchange between evaporator 1 and the incoming air and between reheat coil 2 and the air that has been cooled by evaporator 1. In general, increasing the air flow will also increase the amount of heat that is exchanged.

Similarly, controller 8 may control ventilator or fan 5B to regulate the amount of heat exchanged between condenser 3 and the outside air. Increasing the air flow using ventilator 5B will increase the amount of heat that is exchanged and will consequently lower the temperature and pressure of the refrigerant leaving condenser 3.

The skilled person will realize that the abovementioned embodiments are merely exemplary. Various modifications can be made to the embodiments without departing from the scope of the invention which is defined by the appended claims.

The invention claimed is:

1. A climate control unit for controlling air temperature and humidity, comprising:
   a reheat coil;
   a compressor;
   an evaporator having an output that is connected to an input of the compressor;
   a first expansion device arranged in a first refrigerant path, between an inlet of the climate control unit and an input of the evaporator, and configured to control a flow of the refrigerant in that path and to provide refrigerant directly to the evaporator; and
   a second expansion device arranged in a second refrigerant path, between the reheat coil and the input of the evaporator, and configured to control a flow of the refrigerant in the second refrigerant path and to provide refrigerant directly to the evaporator,
   wherein the first and second refrigerant paths share a common part and each have a respective individual part, and wherein the first and second expansion devices are arranged in the individual parts of the first and second refrigerant paths, respectively, and are configured to independently control the flow of refrigerant through the reheat coil and the flow of refrigerant directly entering the evaporator,
   wherein the first refrigerant path extends between an output of the compressor and an input of the evaporator through the inlet of the climate control unit, and wherein the second refrigerant path extends between the output of the compressor and the input of the evaporator through the reheat coil, and
   wherein the reheat coil is arranged inside the individual part of the second refrigerant path.

2. The climate control unit according to claim 1, wherein at least one of the first and second expansion device is an electronic expansion valve (EEV) or a thermostatic expansion valve (TXV).

3. The climate control unit according to claim 1, further comprising a controller for controlling the compressor and the first and second expansion devices.

4. The climate control unit according to claim 3, further comprising an inverter for supplying power to the compressor, and wherein controlling the compressor comprises controlling the amount of power supplied by the inverter to the compressor.

5. The climate control unit according to claim 3, further comprising a first temperature or pressure sensor for sensing a temperature or a pressure of the refrigerant between the output of the evaporator and the input of the compressor, respectively, wherein the controller is configured to control the first and second expansion devices in dependence of the refrigerant temperature and/or pressure.

6. The climate control unit according to claim 5, wherein the first temperature or pressure sensor is arranged at the output of the evaporator.

7. The climate control unit according to claim 5, wherein the controller is configured to calculate a superheat of the system based on the sensed temperature or pressure, to control the first and/or second expansion devices to ensure that the superheat remains above a first positive threshold, said calculating the superheat comprising subtracting a boiling point of the refrigerant from the sensed temperature of the refrigerant.

8. The climate control unit according to claim 7, wherein the boiling point of the refrigerant is determined by looking up said boiling point of the refrigerant corresponding to the sensed pressure of the refrigerant in a look-up table.

9. The climate control unit according to claim 7, wherein the climate control unit is configured so that a user can select a desired air temperature and humidity, the climate control unit further comprising:
   a ventilator which can be activated by the controller, and which, when activated, causes a first airflow which passes through the evaporator and the reheat coil, in that order; and
   a second temperature or pressure sensor for sensing a temperature and/or humidity of the air in the first airflow upstream of the evaporator and/or a third temperature or pressure sensor for sensing a temperature and/or humidity of the air in the first airflow downstream of the evaporator downstream of the reheat coil,
   wherein the controller is configured, at least during operation, to control the compressor and the first and second expansion devices in dependence of at least one of the air temperature and/or humidity sensed by the second temperature or pressure sensor, the air temperature and/or humidity sensed by the third temperature or pressure sensor, the sensed refrigerant pressure and/or temperature, the desired temperature and the desired humidity.

10. The climate control unit according to claim 9, wherein the controller is configured to operate the climate control unit in a cooling mode, in which mode the controller:
    controls the power supplied to the compressor to control the cooling power of the climate control unit in dependence of the selected desired temperature and the temperature of the air as sensed by the second and/or third temperature or pressure sensor;
    ensures a closed state of the second expansion device; and
    controls the first expansion valve to ensure that the superheat remains positive.

11. The climate control unit according to claim 10, wherein the controller is configured to operate the climate control unit in the cooling mode if the temperature of the air is above the selected desired temperature and if the humidity of the air is at or below the selected desired humidity regardless of the resulting dehumidification.

12. The climate control unit according to claim 10, wherein the controller is configured to operate the climate control unit in a dehumidifying mode in which mode the controller:
    controls the power supplied to the compressor to control the dehumidification power of the climate control unit in dependence of the selected desired humidity and the humidity of the air as sensed by the second and/or third temperature or pressure sensor;
    ensures a closed state of the first expansion device; and
    controls the second expansion device to ensure that the superheat remains positive.

13. The climate control unit according to claim 12, wherein the controller is configured to operate the climate control unit in the dehumidification mode if the temperature of the air is at or below the selected desired temperature and if the humidity of the air is above the selected desired humidity.

14. The climate control unit according to claim 10, wherein the controller is configured to operate the climate control unit in a hybrid mode in which mode the controller:
- controls the power supplied to the compressor to control the dehumidification power of the climate control unit in dependence of the selected desired humidity and the humidity of the air as sensed by the second and/or third temperature or pressure sensor; and
- controls the ratio of refrigerant flowing through the first and second expansion device to keep the cooling power constant.

15. The climate control unit according to claim 14, wherein the controller is configured to switch from the cooling mode to the hybrid mode if the temperature of the air has decreased, during the cooling mode, to a value within a predefined range of the selected desired temperature and if the sensed humidity of the air sensed by the second and/or third temperature or pressure sensor is above the selected desired humidity and/or if a desired humidity has not been inputted.

16. A climate control unit for controlling air temperature and humidity, comprising:
- a reheat coil;
- a compressor;
- an evaporator having an output that is connected to an input of the compressor, the climate control unit being coupled to a condenser for outputting thermal energy, wherein the climate control unit forms a refrigerant circuit together with the condenser;
- a first expansion device arranged in a first refrigerant path, between the condenser and an input of the evaporator, and configured to control a flow of the refrigerant in that path and to provide refrigerant directly to the evaporator; and
- a second expansion device arranged in a second refrigerant path, between the reheat coil and the input of the evaporator, and configured to control a flow of the refrigerant in the second refrigerant path and to provide refrigerant directly to the evaporator,
- wherein the first and second refrigerant paths share a common part and each have a respective individual part, and wherein the first and second expansion devices are arranged in the individual parts of the first and second refrigerant paths, respectively, and are configured to independently control the flow of refrigerant through the reheat coil and the flow of refrigerant directly entering the evaporator,
- wherein the first refrigerant path comprises a pathway defined between an output of the compressor and an input of the evaporator through the condenser, and wherein the second refrigerant path comprises a pathway defined between the output of the compressor and the input of the evaporator through the reheat coil, and wherein the reheat coil is arranged inside the individual part of the second refrigerant path.

17. The climate control unit according to claim 16, wherein the condenser is air-cooled or water-cooled.

18. The climate control unit according to 16, wherein the second refrigerant path extends between the output of the compressor and the input of the evaporator through the condenser and through the reheat coil in that order.

19. The climate control unit according to claim 18, further comprising an outlet connected to the output of the compressor and connectable to an inlet of the condenser, and an inlet connectable to an outlet of the condenser and connected, via a T-junction, to an input of the reheat coil and to an input of the first expansion device.

20. A system, comprising:
- a climate control unit as defined in claim 19, wherein the condenser comprises an inlet and an outlet connected to the outlet and the inlet of the climate control unit, respectively.

21. The climate control unit according to claim 16, wherein the condenser is arranged in the individual part of the first refrigerant path.

22. The climate control unit according to claim 21, further comprising an outlet connectable to an inlet of the condenser, wherein an output of the compressor is connected, via a T-junction, to the outlet and to an input of the reheat coil, and an inlet connected to the first expansion device and connectable to an outlet of condenser.

* * * * *